US012046220B2

(12) United States Patent
Miyajima

(10) Patent No.: US 12,046,220 B2
(45) Date of Patent: Jul. 23, 2024

(54) MARCHING CARRIER

(71) Applicant: HOSHINO GAKKI CO., LTD., Aichi (JP)

(72) Inventor: Hideyuki Miyajima, Nagoya (JP)

(73) Assignee: HOSHINO GAKKI CO., LTD., Nagoya (JP)

( * ) Notice: Subject to any disclaimer, the term of this patent is extended or adjusted under 35 U.S.C. 154(b) by 320 days.

(21) Appl. No.: 17/672,584

(22) Filed: Feb. 15, 2022

(65) Prior Publication Data

US 2022/0375440 A1 Nov. 24, 2022

(30) Foreign Application Priority Data

May 20, 2021 (JP) ................................ 2021-085274

(51) Int. Cl.

*G10D 13/02* (2020.01)
*G10G 5/00* (2006.01)

(52) U.S. Cl.

CPC ............. *G10G 5/005* (2013.01); *G10D 13/02* (2013.01)

(58) Field of Classification Search

CPC ............ G10G 5/005; G10G 7/00; G10G 5/00; G10D 13/02

See application file for complete search history.

(56) References Cited

U.S. PATENT DOCUMENTS

| | | | | |
|---|---|---|---|---|
| 6,323,407 | B1 | 11/2001 | May | |
| 7,554,024 | B2 | 6/2009 | Miyajima | |
| 7,671,261 | B1 | 3/2010 | Momose | |
| 2006/0081115 | A1 | 4/2006 | Shimada | |
| 2008/0264236 | A1* | 10/2008 | Miyajima | G10G 5/005 84/421 |
| 2013/0133505 | A1 | 5/2013 | Momose | |
| 2013/0233148 | A1 | 9/2013 | May | |

FOREIGN PATENT DOCUMENTS

| | | |
|---|---|---|
| JP | 2006146122 A | 6/2006 |

OTHER PUBLICATIONS

Notice of Reasons for Refusal dated Oct. 10, 2023 issued in the corresponding Japanese Patent Application No. 2021-085274 with an English machine translation, 7 pages.

* cited by examiner

*Primary Examiner* — Kimberly R Lockett

(57) ABSTRACT

A marching carrier is worn by a percussion player and supports an instrument at a front of a body of the player. The marching carrier includes a belly plate that covers an abdomen region of the player and includes a belly pad in a section that contacts the abdomen region, and a carrier main body that is put on shoulders of the player and is fixed to the belly plate. The carrier main body includes shoulder pads in sections that contact the shoulders. The carrier main body includes a rod that includes two front extending portions. The front extending portions extend from the shoulders toward the abdomen region. The carrier main body is configured to adjust a position in a front-rear direction of the belly pad.

14 Claims, 8 Drawing Sheets

MARCHING CARRIER

BACKGROUND

1. Field

The present disclosure relates to a marching carrier.

2. Description of Related Art

A percussion player who plays an instrument such as a marching drum supports the instrument at the front of the body when playing the instrument. Accordingly, the percussion player wears a marching carrier as a device for attaching the instrument to their body.

For example, a marching carrier disclosed in U.S. Pat. No. 7,671,261 includes a belly plate, which covers the abdomen region of a player, and a carrier main body, which rests on the shoulder regions and is fixed to the belly plate. The carrier main body includes a substantially U-shaped rod that extends from the back region to the abdomen region via the shoulder regions. The carrier main body includes cushions at sections contacting the back region or the shoulder regions. The belly plate also includes cushions at sections contacting the abdomen region. The cushions reduce the load put on the player due to the weight of the marching carrier.

Percussion players have various physical builds. Depending on the physical build of the player, the weight of a marching carrier may concentrate on a specific region in the body. The cushions in the marching carrier disclosed in U.S. Pat. No. 7,671,261 alone cannot sufficiently reduce the load put on the player due to the weight of the marching carrier. In this regard, a type of marching carrier has been developed in which the shape of the carrier main body is adjustable, as disclosed in U.S. Pat. No. 6,323,407 or 7,554,024.

A marching carrier disclosed in U.S. Pat. No. 6,323,407 includes a belly plate, which covers the abdomen region of a player, straps placed over the back region and the shoulder regions, and a pair of rods connecting the belly plate and the straps to each other. The rods are pivotally joined to the front ends of the side portions of the straps. Accordingly, the marching carrier is configured to adjust the shape of the carrier main body at a single position that corresponds to the chest of the player.

A marching carrier disclosed in U.S. Pat. No. 7,554,024 includes a belly plate and a frame. The belly plate covers the abdomen region of a player and includes a belly cushion. The frame is placed over the back region and the shoulder regions, and includes shoulder cushions. The marching carrier also includes a plate that is fixed to an upper part of the belly plate, and a pair of rods that connects the plate and the frame to each other. The rods are pivotally joined to the upper ends of the sides of the plate and to the front ends of the sides of the frame. Accordingly, the marching carrier is configured to adjust the shape of the carrier main body at two positions that correspond to the chest and the shoulder regions of the player.

In a marching band, players play wind instruments or percussion instruments not only while standing, but also while walking and running. In particular, a percussion player bears not only the load of the percussion instrument, but also the load of the weight of the marching carrier, at sections contacting the marching carrier, such as the back region, the shoulder regions, and the abdomen region. Thus, playing the percussion instrument with the marching carrier while moving around puts a significant load on the player. Accordingly, there is a demand for a marching carrier that reduces the load put on the player.

SUMMARY

It is an objective of the present disclosure to provide a marching carrier that reduces the load put on a player by the marching carrier.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a marching carrier that is configured to be worn by a player and support an instrument at a front of a body of the player is provided. The marching carrier includes a belly plate that is configured to cover an abdomen region of the player and includes a belly pad in a section that contacts the abdomen region, and a carrier main body that is configured to be put on shoulders of the player and is fixed to the belly plate. The carrier main body includes shoulder pads in sections that contact the shoulders. The carrier main body includes a rod that includes two front extending portions. The front extending portions extend from the shoulders toward the abdomen region, and the carrier main body is configured to adjust a position in a front-rear direction of the belly pad.

In another general aspect, a marching carrier that is configured to be worn by a player and support a drum at a front of a body of the player is provided. The drum includes a cylindrical shell and a head attached to an open end of the shell. The drum is arranged such that an axis of the shell is horizontal, and is supported by the marching carrier at a first position and a second position on the shell, the second position being below the first position. The marching carrier includes a belly plate that is configured to cover an abdomen region of the player and includes a belly pad in a section that contacts the abdomen region, a carrier main body that is configured to be put on shoulders of the player and is fixed to the belly plate, an upper supporting member that is configured to support the drum at the first position on the shell, and a lower supporting member that supports the drum at the second position on the shell. The carrier main body includes a rod that includes two front extending portions. The front extending portions extend from the shoulders toward the abdomen region. The upper supporting member is slidably attached to the front extending portions.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, “at least one of A and B” should be understood to mean “only A, only B, or both A and B.”

First Embodiment

A marching carrier 10 according to a first embodiment of the present disclosure will now be described with reference to FIGS. 1 to 6.

Figure 1:
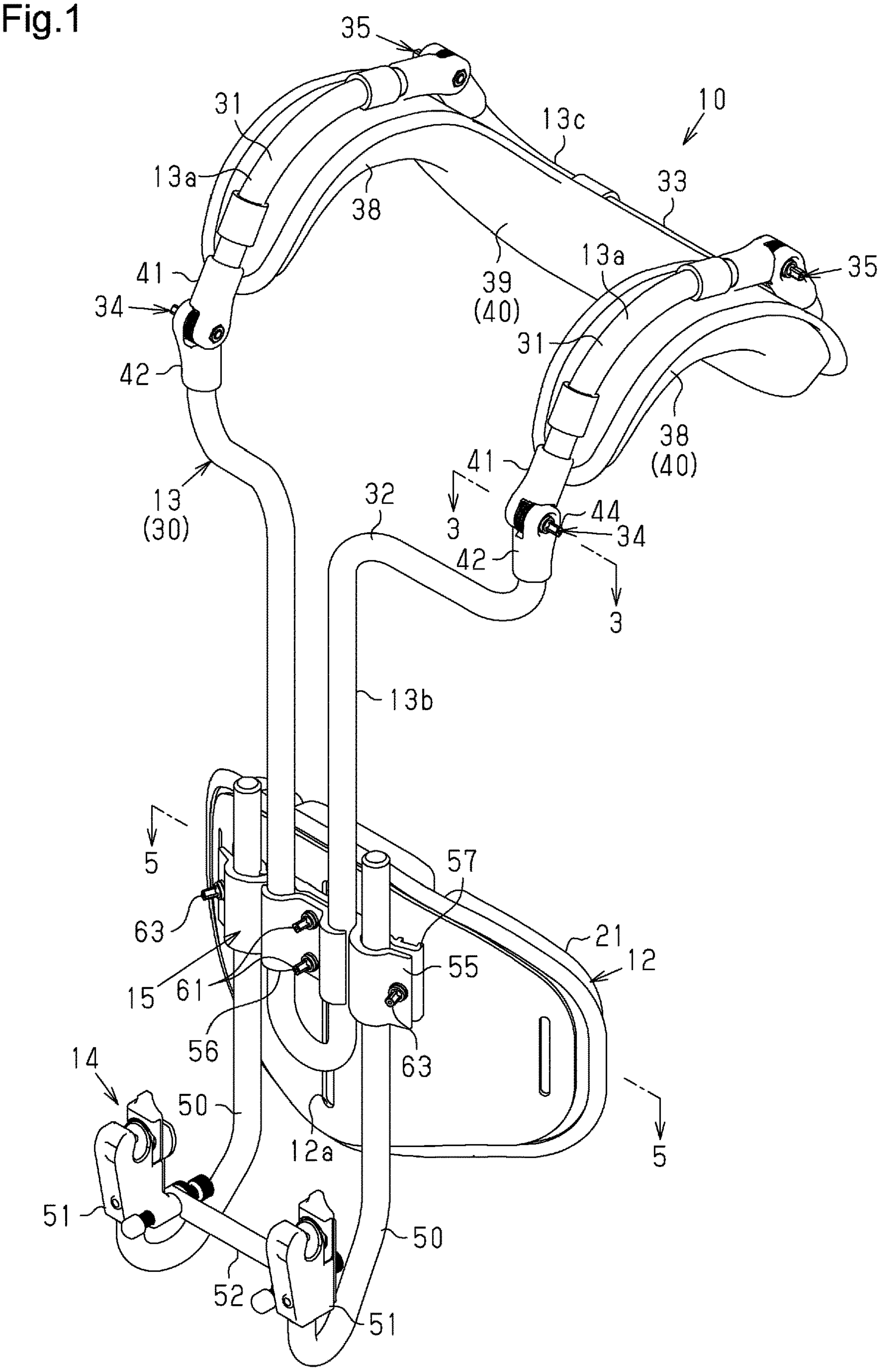
FIG. 1 is a perspective view of a marching carrier according to a first embodiment of the present disclosure.
Figure 2:
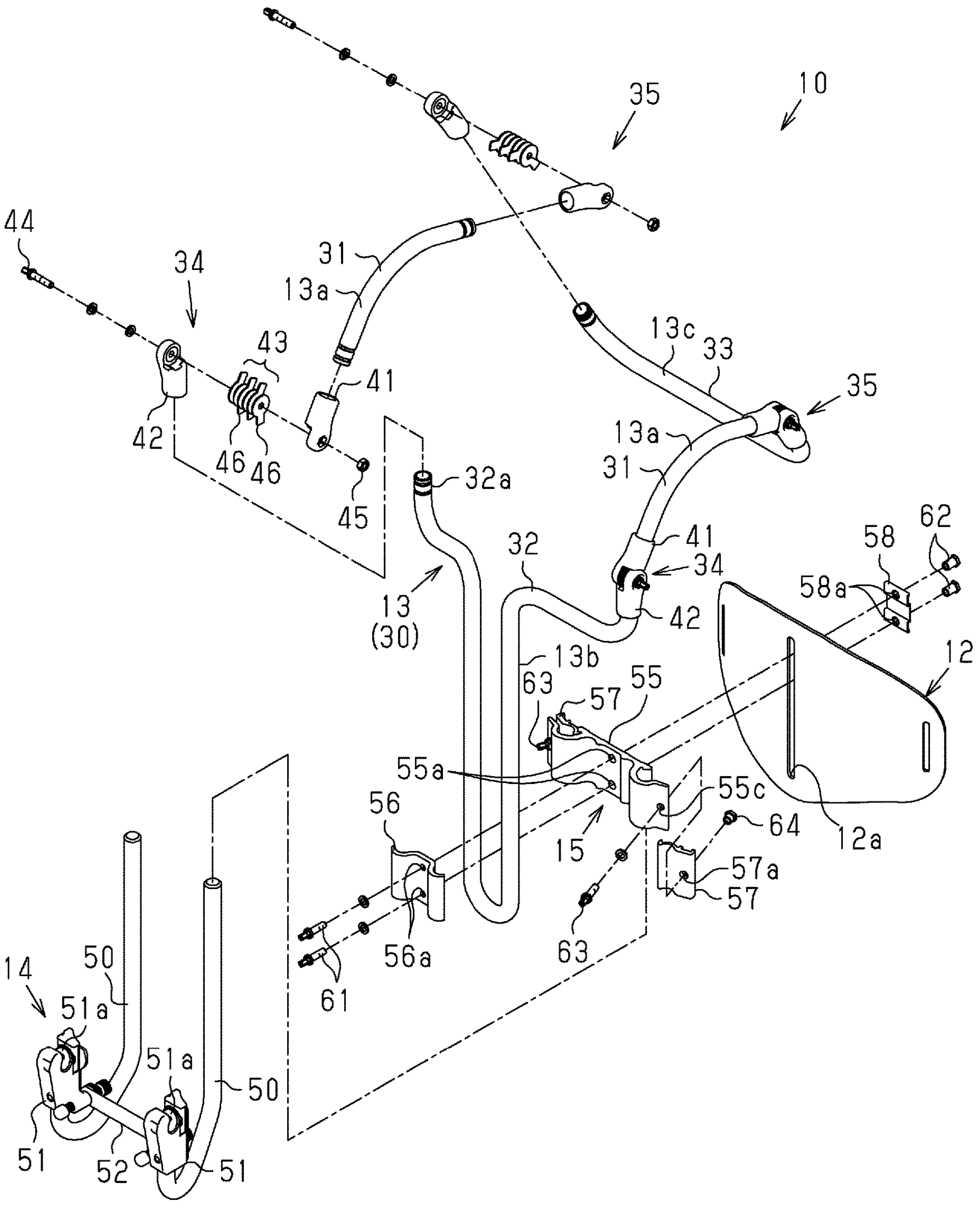
FIG. 2 is an exploded perspective view of the marching carrier shown in FIG. 1.

As shown in FIGS. 1 and 2, the marching carrier 10 includes a belly plate 12, a carrier main body 13, an instrument supporting member 14, and a fixing assembly 15. The marching carrier 10 is worn by a percussion player and is used as a device that supports a percussion instrument such as a marching drum at the front of the body of the player. The marching carrier 10 is obtained by using the fixing assembly 15 to assemble the belly plate 12, the carrier main body 13, and the instrument supporting member 14 together.

The belly plate 12 includes a section that covers the abdomen region of the player. The belly plate 12 is made of a material having a stiffness such as metal or plastic. The belly plate 12 has an insertion hole 12*a* at a central portion. The insertion hole 12*a* is used to attach the carrier main body 13 to the belly plate 12. The insertion hole 12*a* extends linearly from a position close to the upper end to a position close to the lower end of the belly plate 12. The belly plate 12 has a belly pad 21 in a section that contacts the abdomen region. The belly pad 21 includes a plate-shaped cushion to reduce the load put on the body of the player by the marching carrier 10, such as a load from the weight and impacts of marching carrier 10. The belly pad 21 has substantially the same shape as the belly plate 12.

The carrier main body 13 includes a portion of the marching carrier 10 that is put on the shoulder regions of the player and arranged above the belly plate 12. The carrier main body 13 is fixed, by the fixing assembly 15, to a surface of the belly plate 12 on the side opposite to the belly pad 21, that is, to a central portion of the front surface of the belly plate 12. The carrier main body 13 includes a framework 30, which includes rods, and a cushion 40, which covers the shoulder regions and the back region. The cushion 40 substantially has the shape of a U in plan view. The cushion 40 includes shoulder pads 38, which are sections contacting the shoulder regions, and a back pad 39, which is a section contacting the back region.

The framework 30 includes left and right first rods 31, a second rod 32, which is joined to the front ends of the first rods 31, and a third rod 33, which is joined to the rear ends of the first rods 31. The cushion 40 is attached to the rods of the framework 30 to be pivotal about the axes of the rods. In the cushion 40, the shoulder pads 38 are pivotal with respect to the first rods 31, and the back pad 39 is pivotal with respect to the third rod 33.

Further, the framework 30 includes left and right main-body adjusters 34 and left and right back-portion adjusters 35. The main-body adjusters 34 are provided at the joints between the first rods 31 and the second rod 32. The main-body adjusters 34 are located on the same axis in a side view of the marching carrier 10. The back-portion adjusters 35 are provided at the joints between the first rods 31 and the third rod 33. The back-portion adjusters 35 are located on the same axis in a side view of the marching carrier 10.

The first to third rods 31 to 33 are made of a material having stiffness such as metal or plastic. Specifically, the first to third rods 31 to 33 include metal pipes or plastic pipes. The first rods 31 include sections that are put on the shoulder regions, that is, upper trunk portions 13*a*, which are arranged above the main-body adjusters 34. The first rods 31 are gently curved to conform to the shapes of the shoulder regions. The second rod 32 includes a section that is arranged at the front of the body, that is, a lower trunk portion 13*b*, which is arranged below the main-body adjusters 34. The second rod 32 has the shape of a vertically elongated U. The second rod 32 includes left and right symmetrical upper end portions 32*a*, which are each bent into the shape of an S. The third rod 33 includes a section that is put on the back region of the player, that is, a back portion 13*c*, which is arranged behind the back-portion adjusters 35. The third rod 33 has the shape of a horizontally elongated U.

As a whole, the framework 30 has the shape of a loop. The main-body adjusters 34 are arranged at the front of the framework 30. Specifically, the main-body adjusters 34 are respectively provided in a pair of left and right front extending portions, which extend from the shoulder regions toward the abdomen region. The front extending portions include parts of the first rods 31 that extend forward and the second rod 32. The framework 30 includes, at the rear, left and right rear extending portions, which extend from the shoulder regions toward the back region. The back-portion adjusters 35 are respectively provided in the rear extending portions. The rear extending portions include parts of the first rods 31 that extend rearward and the third rod 33.

The main-body adjusters 34 pivotally join the first rods 31 and the second rod 32 to each other, so that the lower trunk portion 13*b* is pivotal with respect to the upper trunk portions 13*a*. The carrier main body 13 includes the main-body adjusters 34 and is thus configured to adjust the position of the lower trunk portion 13*b* with respect to the upper trunk portions 13*a*. That is, the carrier main body 13 includes the main-body adjusters 34 and is thus configured to adjust the position in the front-rear direction of the belly pad 21, without changing the position of the shoulder pads 38.

The back-portion adjusters 35 pivotally join the first rods 31 and the third rod 33 to each other, so that the back portion 13*c* is pivotal with respect to the upper trunk portions 13*a*. The carrier main body 13 includes the back-portion adjusters 35 and is thus configured to adjust the position of the back portion 13*c* with respect to the upper trunk portions 13*a*. That is, the carrier main body 13 includes the back-portion adjusters 35 and is thus configured to adjust the position in the front-rear direction of the back portion 13*c*, without changing the positions of the shoulder pads 38.

Figure 3:
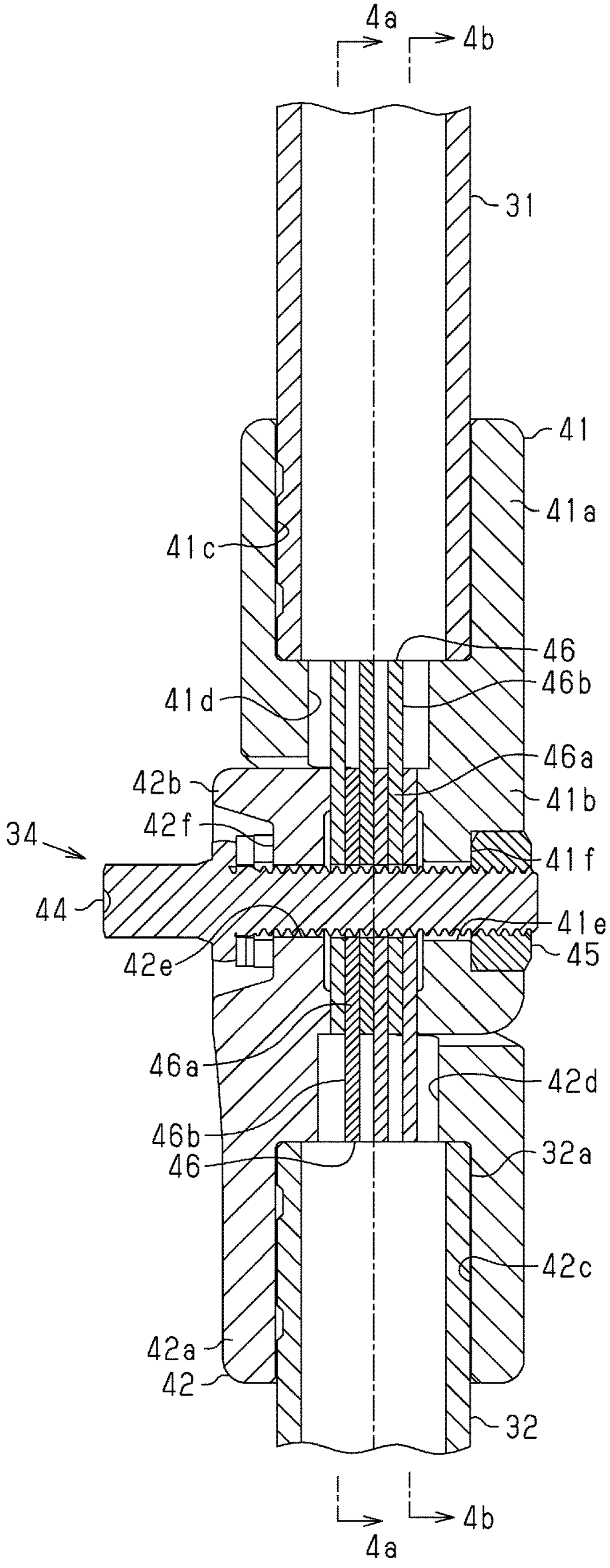
FIG. 3 is a partial cross-sectional view taken along line 3-3 of FIG. 1.

As shown in FIGS. 2 and 3, the main-body adjusters 34 join the first rods 31 and the second rod 32 to each other while arranging the first rods 31 and the second rod 32 on the same line when the marching carrier 10 is viewed from the front. The main-body adjusters 34 include first tubular members 41, which are attached to the front ends of the first rods 31, and second tubular members 42, which are attached to the upper end portions 32*a* of the second rod 32. The main-body adjusters 34 each include a multi-plate clutch 43, which includes six friction plates 46, a bolt 44, and a nut 45. The back-portion adjusters 35 have the same structure as the main-body adjusters 34 except that the back-portion adjusters 35 adjust the pivot position of the third rod 33 with respect to the first rods 31. The detailed description of the configuration of the back-portion adjusters 35 that is the same as that of the main-body adjusters 34 will be omitted.

Figure 4A:
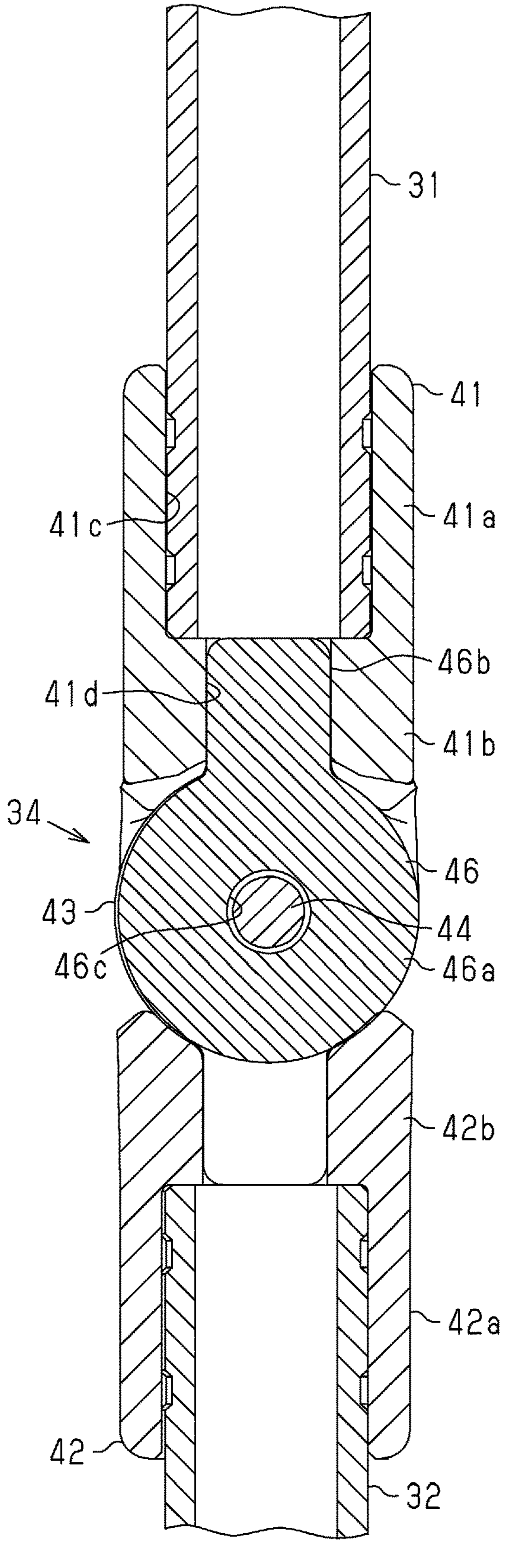
FIG. 4A is a partial cross-sectional view taken along line **4*a*-4*a* of FIG. 3**.
Figure 4B:
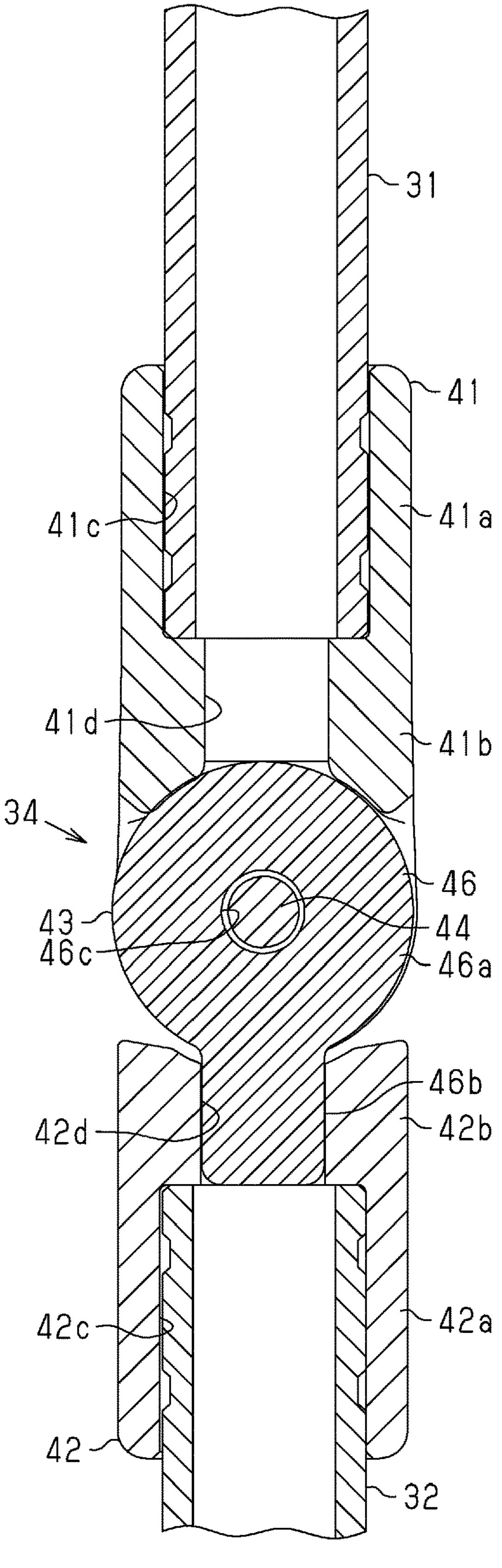
FIG. 4B is a partial cross-sectional view taken along line **4*b*-4*b* of FIG. 3**.

As shown in FIGS. 3, 4A, and 4B, the first tubular members 41 each include a first fixed portion 41*a*, which is fixed to the first rod 31, and a first joint portion 41*b*, which is joined to the second tubular member 42. The first fixed portion 41*a* has a fixing hole 41*c*, to which the first rod 31 is fixed, and a fixing hole 41*d*, to which the multi-plate clutch 43 is fixed. The fixing holes 41*c*, 41*d* are arranged on the same axis and continuous with each other. The first joint portion 41*b* has an insertion hole 41*e*, into which the bolt 44 is inserted. The first joint portion 41*b* also has a recess 41*f*, into which the nut 45 is fitted, in the outer surface. The insertion hole 41*e* and the recess 41*f* are arranged on the same axis and continuous with each other.

The second tubular members 42 each include a second fixed portion 42*a*, which is fixed to the second rod 32, and a second joint portion 42*b*, which is joined to the first tubular member 41. The second fixed portion 42*a* has a fixing hole 42*c*, to which the second rod 32 is fixed, and a fixing hole 42*d*, to which the multi-plate clutch 43 is fixed. The fixing holes 42*c*, 42*d* are arranged on the same axis and continuous with each other. The second joint portion 42*b* has an insertion hole 42*e*, into which the bolt 44 is inserted. The second joint portion 42*b* also has a recess 42*f*, in which the head of the bolt 44 is arranged, in the outer surface. The insertion hole 42*e* and the recess 42*f* are arranged on the same axis and continuous with each other.

Each friction plate 46 includes a circular disc portion 46*a* and a rectangular fixing tab 46*b*. The disc portion 46*a* has, at its center, an insertion hole 46*c* into which the bolt 44 is inserted. The fixing tab 46*b* extends outward in the radial direction from the outer peripheral edge of the disc portion 46*a*. The friction plates 46 are arranged between the first joint portion 41*b* and the second joint portion 42*b*. The friction plates 46 are stacked in the direction of the axis of pivoting motion of the second rod 32 with respect to the first rod 31. Among the six friction plates 46, the fixing tabs 46*b* of the odd-numbered friction plate 46 counting from the left as viewed in FIG. 3 are fixed to the fixing hole 41*d* of the first joint portion 41*b*. The fixing tabs 46*b* of the even-numbered friction plates 46 counting from the left are fixed to the fixing hole 42*d* of the second joint portion 42*b*.

The bolt 44 is inserted into the insertion holes 42*e*, 46*c*, 41*e* of the second joint portion 42*b*, the friction plates 46, and the first joint portion 41*b*, and is threaded to the nut 45. The bolt 44 is tightened or loosened to increase or decrease the force with which the first joint portion 41*b* and the second joint portion 42*b* hold the friction plates 46. This locks the position of the position of the second rod 32 with respect to the first rod 31 or releases the second rod 32 from the first rod 31.

As shown in FIGS. 1 and 2, the instrument supporting member 14 includes two support rods 50, two hooks 51 attached to the distal ends of the support rods 50, and a bridging member 52, which connects the hooks 51 to each other. Each support rod 50 has the shape of a J with the distal end directed upward. A percussion instrument supported by the marching carrier 10 is attached to the upper surfaces of the hooks 51. The instrument supporting member 14 is configured to support the percussion instrument at the front of the body of the player by joining the percussion instrument to the hooks 51 and fixing the support rods 50 to the carrier main body 13. Also, the instrument supporting member 14 is fixed to the fixing assembly 15 with the support rods 50, so as to be directly attached to the lower trunk portion 13*b* of the carrier main body 13.

The fixing assembly 15 includes a substantially rectangular fixing base 55 and a first fixing member 56, which is fixed to the center on the front side of the fixing base 55. The fixing assembly 15 also includes two second fixing members 57 and a third fixing member 58. The second fixing members 57 are fixed to opposite ends on the back side of the fixing base 55. The third fixing member 58 is fixed to the fixing base 55 from the back side of the belly plate 12. The fixing assembly 15 includes combined components and is configured to fasten the instrument supporting member 14 to the carrier main body 13, and to fasten the carrier main body 13 to the belly plate 12.

Figure 5:
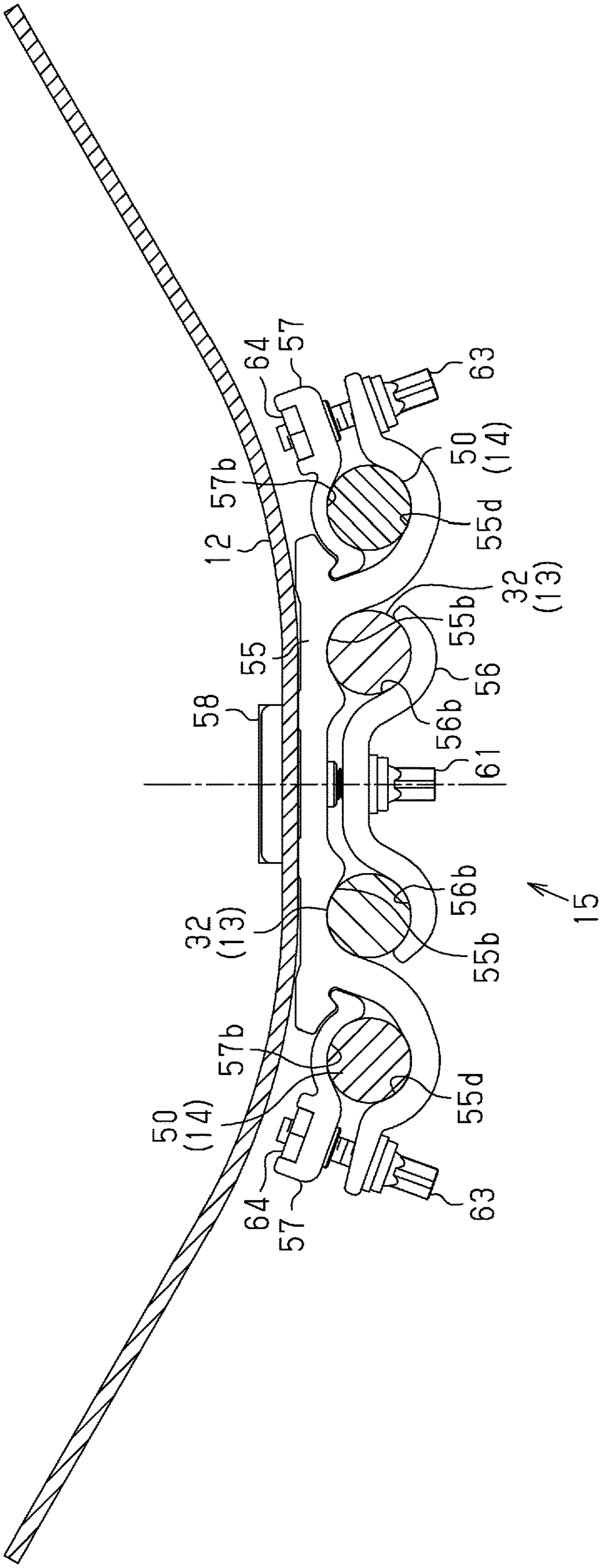
FIG. 5 is a partial cross-sectional view taken along line 5-5 of FIG. 1.

As shown in FIGS. 2 and 5, the fixing base 55 has upper and lower insertion holes 55*a* at the center. The fixing base 55 also has left and right main body fixing recesses 55*b* in sections near the center on the front side. The main body fixing recesses 55*b* are parallel with each other and extend vertically. The fixing base 55 has an insertion hole 55*c* at each of the opposite ends. The fixing base 55 also has left and right rod fixing recesses 55*d* at the opposite ends on the back side. The rod fixing recesses 55*d* are parallel with each other and extend vertically.

The first fixing member 56 has upper and lower insertion holes 56*a* at the center. The first fixing member 56 has curved recesses 56*b* at opposite ends. The third fixing member 58 has upper and lower insertion holes 58*a* at the center. The first fixing member 56, the fixing base 55, the belly plate 12, and the third fixing member 58 are arranged such that the insertion holes 56*a*, 55*a*, 12*a*, 58*a* are coaxial. In this state, two bolts 61 are inserted into the insertion holes 56*a*, 55*a*, 12*a*, 58*a* and threaded to nuts 62 on the back side of the third fixing member 58. This fastens the first fixing member 56 to the fixing base 55, and fastens the fixing base 55 and the third fixing member 58 to the belly plate 12. In this state, spaces in which the second rod 32 of the carrier main body 13 is arranged are defined between the main body fixing recesses 55*b* and the curved recesses 56*b*.

Each second fixing member 57 has an insertion hole 57*a*, into which a bolt 63 is inserted. Each second fixing member 57 has a curved recess 57*b* on the side opposite to the insertion hole 57*a*. Each second fixing member 57 and the fixing base 55 are arranged such that the insertion holes 57*a*, 55*c* are coaxial. In this state, the bolts 63 are inserted into the insertion holes 57*a*, 55*c* and threaded to nuts 64 on the back side of the second fixing members 57. This fastens the second fixing members 57 to the fixing base 55. In this state, spaces in which the support rods 50 of the instrument supporting member 14 are arranged are defined between the rod fixing recesses 55*d* and the curved recesses 57*b*.

Operation of the marching carrier 10 will now be described with reference to FIGS. 1, 3, 5, and 6.

Figure 6:
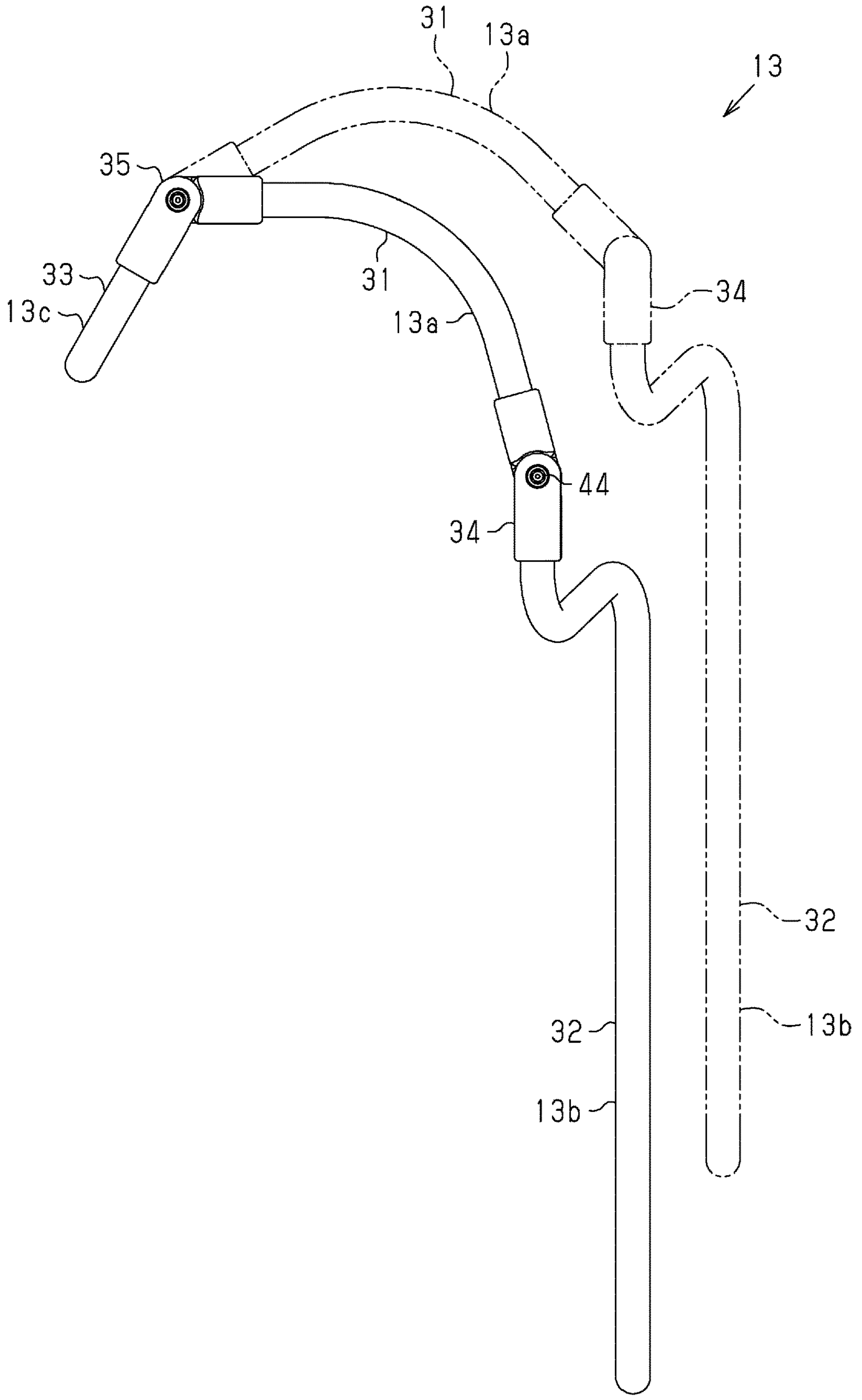
FIG. 6 is an operational diagram of the marching carrier shown in FIG. 1.

As shown in FIGS. 1 and 6, the marching carrier 10 includes the two front extending portions, which extend from the shoulder regions toward the abdomen region of the player. The front extending portions include the first rods 31 and the second rod 32. The marching carrier 10 includes the main-body adjusters 34 at the joints between the first rods 31 and the second rod 32. Also, the marching carrier 10 includes the two rear extending portions, which extend from the shoulder regions toward the back region of the player. The rear extending portions include the first rods 31 and the third rod 33. The marching carrier 10 includes the back-portion adjusters 35 at the joints between the first rods 31 and the third rod 33. The player adjusts the shape of the carrier main body 13 and the vertical position of the belly plate 12 in correspondence with his/her physical build according to the procedure discussed below. The player also adjusts the vertical position of the instrument supporting member 14 so that the percussion instrument is at a position where it is easy to play.

As shown in FIGS. 1, 3, and 6, the bolts 44 of the left and right main-body adjusters 34 are loosened to adjust the shape of the carrier main body 13. This reduces the force with which the first joint portion 41*b* and the second joint portion 42*b* hold the friction plate 46 in the main-body adjusters 34. This allows the disc portions 46*a* of the friction plate 46 to slide on each other about the axis of the bolt 44. Accordingly, the second rod 32 is pivotal with respect to the first rods 31, so that the pivot position of the lower trunk portion 13*b* can be adjusted with respect to the upper trunk portions 13*a*.

When operation similar to the above-described operation is performed for the left and right back-portion adjusters 35, the third rod 33 is allowed to pivot with respect to the first rods 31, so that the pivot position of the back portion 13*c* is adjustable with respect to the upper trunk portions 13*a*. For example, when a player of a large physical build wears the marching carrier 10, the shape of the carrier main body 13 is adjusted in the following manner. For example, as indicated by the long-dash double-short-dash lines in FIG. 6, the main-body adjusters 34 are used to reduce the angle between the first rods 31 and the second rod 32. Also, the back-portion adjusters 35 are used to increase the angle between the first rods 31 and the third rod 33.

After the shape of the carrier main body 13 is adjusted, the bolts 44 of the main-body adjusters 34 are tightened. This increases the force with which the first joint portion 41*b* and the second joint portion 42*b* hold the friction plates 46 in the main-body adjusters 34. This prevents the disc portions 46*a* of the friction plate 46 from sliding on each other about the axis of the bolt 44. Accordingly, the pivot position of the second rod 32 is fixed with respect to the first rods 31, so that the pivot position of the lower trunk portion 13*b* is fixed with respect to the upper trunk portions 13*a*. When operation similar to the above-described operation is performed for the back-portion adjusters 35, the pivot position of the third rod 33 is fixed with respect to the first rods 31, so that the pivot position of the back portion 13*c* is fixed with respect to the upper trunk portions 13*a*. Subsequently, the vertical positions of the belly plate 12 and the instrument supporting member 14 are adjusted.

With reference to FIGS. 1 and 5, the upper and lower bolts 61 of the fixing assembly 15 are loosened. This reduces the force with which the fixing base 55 and the first fixing member 56 hold the second rod 32 and also reduces the force with which the fixing base 55 and the third fixing member 58 hold the belly plate 12. In this case, since the first fixing member 56 stops pressing the second rod 32, the fixing assembly 15 is allowed to move relative to the second rod 32. This allows the vertical positions of the belly plate 12 and the instrument supporting member 14 to be adjusted together with the fixing assembly 15. Also, in this case, since the third fixing member 58 stops pressing the belly plate 12, the belly plate 12 is movable with respect to the fixing assembly 15 in a range in which the bolts 61 can be moved in the insertion hole 12*a* of the belly plate 12. Accordingly, the vertical position of the belly plate 12 can be adjusted within a distance corresponding to the entire length of the insertion hole 12*a*. At this time, the vertical position of the belly plate 12 can be adjusted alone without changing the position of the second rod 32 of the fixing assembly 15, that is, while maintaining the vertical position of the instrument supporting member 14. After adjusting the vertical position of the belly plate 12, the bolts 61 are tightened to fasten the fixing assembly 15 to the second rod 32 and fasten the fixing base 55 and the third fixing member 58 to the belly plate 12.

In order to further adjust the vertical position of the instrument supporting member 14, the bolts 63 of the fixing assembly 15 are loosened. This reduces the force with which the fixing base 55 and the second fixing member 57 hold the support rods 50. Accordingly, the support rods 50 are movable relative to the fixing assembly 15, so that the vertical position of the instrument supporting member 14 is adjustable. After the adjustment, the bolts 63 of the fixing assembly 15 are tightened to increase the force with which the fixing base 55 and the second fixing members 57 hold the support rods 50. This fixes the vertical position of the instrument supporting member 14, so that the vertical position of the percussion instrument is fixed.

The first embodiment thus achieves the following advantages.

(1) The framework 30 of the carrier main body 13 includes the left and right first rods 31, the second rod 32, which is joined to the front ends of the first rods 31, and the third rod 33, which is joined to the rear ends of the first rods 31. The front extending portions include parts of the first rods 31 that extend forward and the second rod 32. The main-body adjusters 34 are provided at the joints between the first rods 31 and the second rod 32. The carrier main body 13 includes the main-body adjusters 34 and is thus configured to adjust the position in the front-rear direction of the belly pad 21.

With this configuration, the carrier main body 13 is almost entirely formed of rods by using rods that extend from the shoulder regions toward the abdomen region of the player. As compared to the structure according to a related art, in which straps and plates are used in parts of the carrier main body 13, the weight of the carrier main body 13 is reduced. Accordingly, the weight of the marching carrier 10 is reduced. Also, the position of the belly pad 21 in the front-rear direction can be adjusted to adjust the shape of the carrier main body 13 in correspondence with the physical build of the player, particularly, the thickness of the body of the player. Thus, regardless of the physical build of the player, the weight of the marching carrier 10 is prevented from concentrating on a specific section in the body. This reduces the load put on the player by the marching carrier 10.

(2) The main-body adjusters 34 are arranged at the front of the framework 30. Specifically, the main-body adjusters 34 are respectively provided in a pair of front extending portions, which extend from the shoulder regions toward the abdomen region. With this configuration, the positional relationship between sections of the carrier main body 13 that are above and below the main-body adjusters 34 to be adjusted. This allows the position of the belly pad 21 in the front-rear direction to be adjusted, so that the shape of the carrier main body 13 can be adjusted.

(3) The carrier main body 13 is configured to use the main-body adjusters 34 to adjust the position of the lower trunk portion 13*b* with respect to the upper trunk portions 13*a*. With this configuration, the position of the lower trunk portion 13*b* is adjusted with respect to the upper trunk portions 13*a*, so that the shape of the carrier main body 13 is adjusted in correspondence with the physical build of the player. This allows the positions of the shoulder pads 38 and the belly pad 21 to be properly adjusted. This further reduces the load put on the player by the marching carrier 10.

(4) The main-body adjusters 34 are configured to pivotally join the lower trunk portion 13*b* to the upper trunk portions 13*a*, and to fix the pivot position of the lower trunk portion 13*b* with respect to the upper trunk portions 13*a*. This configuration allows the shape of the carrier main body 13 to be easily changed in correspondence with the physical build of the player by pivoting the lower trunk portion 13*b* with respect to the upper trunk portions 13*a*, and fixing the pivot position of the lower trunk portion 13*b* with respect to the upper trunk portions 13*a*. This readily allows the positions of the shoulder pads 38 and the belly pad 21 to be properly adjusted. This further reduces the load put on the player by the marching carrier 10.

(5) The framework 30 includes, at the rear, the two rear extending portions, which extend from the shoulder regions toward the back region. The back-portion adjusters 35 are respectively provided in the rear extending portions. With this configuration, the back-portion adjusters 35 adjust the position of the back pad 39 in the front-rear direction in correspondence with the physical build of the player, so as to adjust the shape of a part of the carrier main body 13 that includes the back portion 13*c*. Thus, regardless of the physical build of the player, the weight of the marching carrier 10 is further prevented from concentrating on a specific section in the body. This further reduces the load put on the player by the marching carrier 10.

(6) The back-portion adjusters 35 are configured to pivotally join the back portion 13*c* to the upper trunk portions 13*a*, and to fix the pivot position of the back portion 13*c* with respect to the upper trunk portions 13*a*. This configuration allows the shape of the part of the carrier main body 13 that includes the back portion 13*c* to be easily changed in correspondence with the physical build of the player by pivoting the back portion 13*c* with respect to the upper trunk portions 13*a*, and fixing the pivot position of the back portion 13*c* with respect to the upper trunk portions 13*a*. This readily allows the positions of the back pad 39 to be properly adjusted. This further reduces the load put on the player by the marching carrier 10.

(7) The main-body adjusters 34 pivotally join the first rods 31 and the second rod 32 to each other while arranging the first rods 31 and the second rod 32 on the same line in plan view from the front of the marching carrier 10. In this configuration, the main-body adjusters 34 are provided in the middle of the front extending portions, which extend from the shoulder regions to the abdomen region of the player. The section including the main-body adjusters 34 of the carrier main body 13 thus has a compact shape arranged on a straight line in plan view. Also, since the carrier main body 13 uses a reduced amount of rods, the weight of the marching carrier 10 is reduced. This further reduces the load put on the player by the marching carrier 10.

(8) The main-body adjusters 34 each include the multi-plate clutch 43. With this configuration, the multi-plate clutches 43 increase the force with which the second rod 32 is fixed to the first rods 31. Thus, even when the player moves around and plays the percussion instrument such as the marching drum while wearing the marching carrier 10, the pivot position of the lower trunk portion 13*b* is fixed with respect to the upper trunk portions 13*a*, and the shoulder pads 38 and the belly pad 21 are fixed at proper positions. Also, since the friction plates 46 of the multi-plate clutches 43 are stacked in the direction of the pivoting axis of the second rod 32, the shapes of the joints between the first rods 31 and the second rod 32 are compact.

(9) The carrier main body 13 includes the framework 30, which includes rods and has the shape of a loop as a whole. With this configuration, since the rods of the carrier main body 13 form a loop, the carrier main body 13 has an increased resistance against torsion, as compared to a structure with a substantially U-shaped rod. The pivoting axes of the left and right main-body adjusters 34 are thus unlikely to be displaced from each other. This allows for a smooth operation for adjusting the pivot position of the lower trunk portion 13*b* with respect to the upper trunk portions 13*a*. Likewise, the pivoting axes of the left and right back-portion adjusters 35 are unlikely to be displaced from each other. This allows for a smooth operation for adjusting the pivot position of the back portion 13*c* with respect to the upper trunk portions 13*a*.

(10) The instrument supporting member 14 is fixed to the fixing assembly 15 with the support rods 50, so as to be directly attached to the lower trunk portion 13*b* of the carrier main body 13. With this configuration, the instrument supporting member 14 is fixed to the carrier main body 13, unlike the related art, in which the instrument supporting member 14 is fixed to the belly plate 12. This reduces the required strength of the belly plate 12. This allows the belly plate 12 to be thinner and facilitates selection of material, so that the weight of the marching carrier 10 is reduced easily. Also, since the instrument supporting member 14 is fixed to the carrier main body 13, the instrument supporting member 14 is arranged near the center of the body of the player. Thus, the instrument supporting member 14 does not hinder movement of the legs of the player when the player wears the marching carrier 10 and moves around while playing the instrument.

(11) The fixing assembly 15 is configured to fix second rod 32 between the fixing base 55 and the first fixing member 56. This configuration allows the fixing assembly 15 to be moved together with the instrument supporting member 14 with respect to the second rod 32 when the force with which the first fixing member 56 is fixed to the fixing base 55 is reduced. Also, since the second rod 32 is fixed between the fixing base 55 and the first fixing member 56, the fixing assembly 15 is fixed to the second rod 32 together with the instrument supporting member 14. In this manner, adjustment of the force with which the second rod 32 is fixed to the fixing base 55 allows the vertical position of the percussion instrument to be adjusted with the percussion instrument supported at the front of the body of the player. Also, since the second rod 32 is fixed between the fixing base 55 and the first fixing member 56, the structure of the carrier main body 13 is reinforced. This further increases the resistance against torsion.

(12) The fixing assembly 15 is configured to be fixed to the belly plate 12 using the third fixing member 58. With this configuration, the fixing assembly 15 fastens not only the instrument supporting member 14 to the carrier main body 13, but also the carrier main body 13 to the belly plate 12. This reduces the number of components required to assemble the instrument supporting member 14, the carrier main body 13, and the belly plate 12 together. The weight of the marching carrier 10 is thus easily reduced.

(13) The belly plate 12 has the insertion hole 12*a*, which is used to fix the marching carrier 10, at the center. The insertion hole 12*a* extends linearly from a position close to the upper end to a position close to the lower end of the belly plate 12. This configuration allows the belly plate 12 to be moved in the vertical direction, in which the insertion hole 12*a* extends, with respect to the second rod 32, by reducing the force with which the third fixing member 58 is fixed to the belly plate 12. The belly plate 12 is fixed to the second rod 32 by fixing the third fixing member 58 to the belly plate 12. In this manner, by adjusting the force with which the third fixing member 58 is fixed to the belly plate 12, the vertical position of the belly plate 12 can be adjusted alone while maintaining the vertical position of the instrument supporting member 14.

Second Embodiment

Next, a marching carrier 70 according to a second embodiment of the present disclosure will be described with reference to FIGS. 7 to 8B. Like or the same reference numerals are given to those components in the second embodiment that are like or the same as the corresponding components of the first embodiment.

Figure 7:
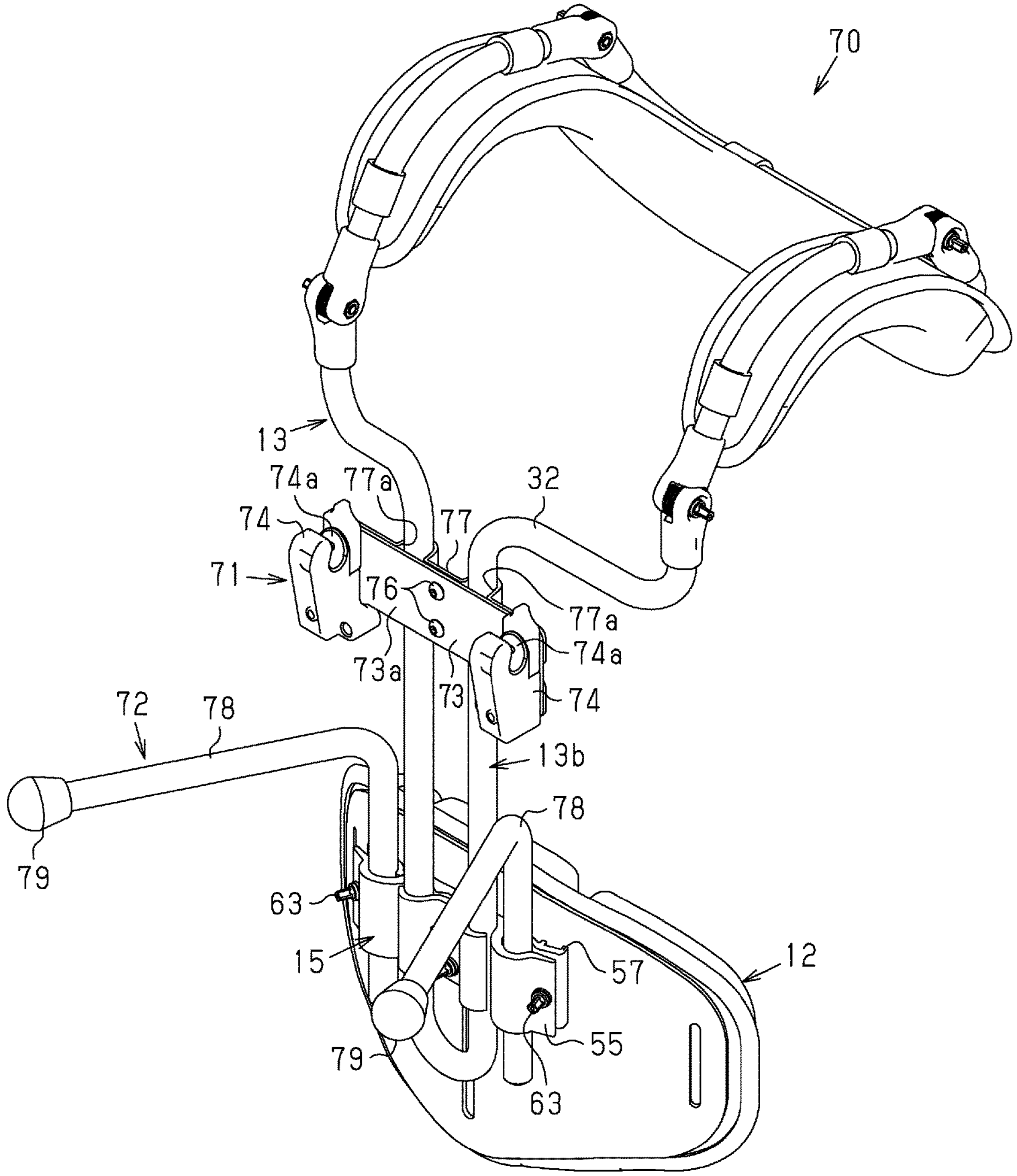
FIG. 7 is a perspective view of a marching carrier according to a second embodiment of the present disclosure.

As shown in FIG. 7, the marching carrier 70 includes a belly plate 12, a carrier main body 13, an upper supporting member 71, a lower supporting member 72, and a fixing assembly 15. The belly plate 12, the carrier main body 13, and the lower supporting member 72 are assembled together using the fixing assembly 15. The upper supporting member 71 is directly attached to a lower trunk portion 13*b* of the carrier main body 13. The marching carrier 70 is worn by a player and used as a device that supports a vertically arranged drum such as a bass drum at the front of the body of the player.

Figure 8B:
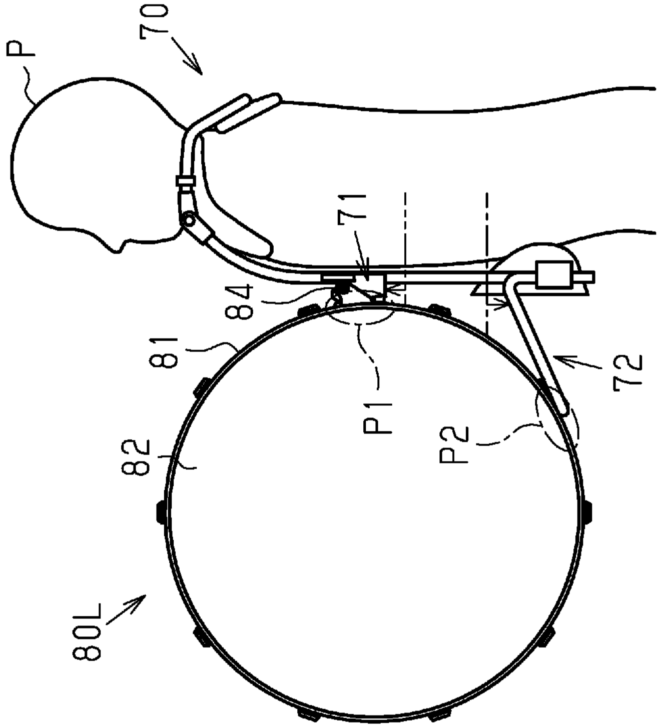
FIG. 8B is an operational diagram of the marching carrier shown in FIG. 7.
Figure 8A:
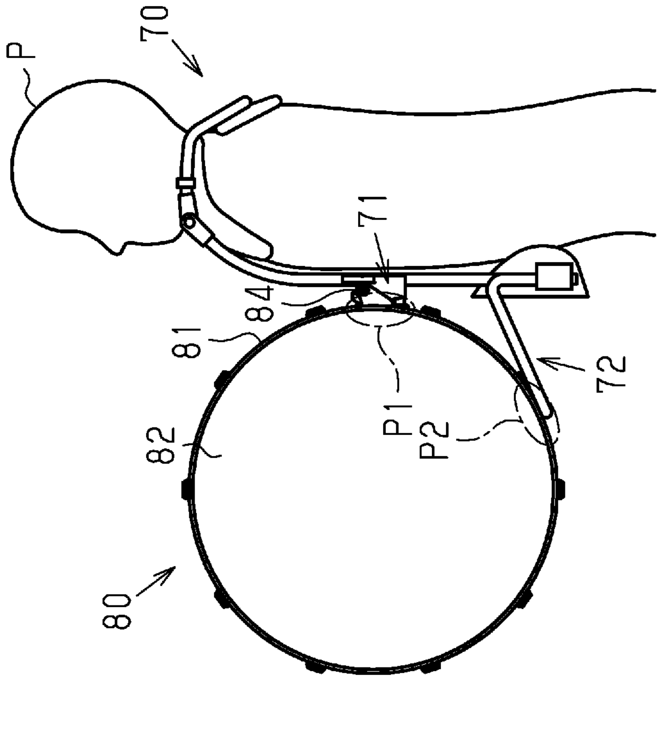
FIG. 8A is an operational diagram of the marching carrier shown in FIG. 7.

As shown in FIGS. 7, 8A, and 8B, the bass drum 80 includes a cylindrical shell 81, and heads 82 attached to the open ends of the shell 81. The bass drum 80 also includes a joint shaft 84, which is joined to upper supporting member 71, on the outer circumferential surface of the shell 81. The marching carrier 70 is configured to arrange the axis of the shell 81 to be horizontal, and to support the bass drum 80 at two positions on the shell 81, namely a first position P1 and a second position P2. The joint shaft 84 is fixed to the first position P1 on the shell 81.

The upper supporting member 71 includes a front surface member 73, to which the bass drum 80 is joined, and a back surface member 77, to which the front surface member 73 is fixed. The front surface member 73 includes a rectangular plate 73*a* and two hooks 74, which are fixed to opposite ends of the plate 73*a*. Each hook 74 has a fitting recess 74*a*, which opens upward. The joint shaft 84 of the bass drum 80 is fitted in the fitting recesses 74*a*. The upper supporting member 71 receives upper and lower bolts 76 at the center. The bolts 76 are threaded to nuts (not shown) provided on the back side of the back surface member 77.

The back surface member 77 includes a rectangular plate. The back surface member 77 has, near the center, two rod fixing recesses 77*a*, in which the second rod 32 is arranged. The rod fixing recesses 77*a* are parallel with each other and extend vertically. The rod fixing recesses 77*a* are each formed by bending part of the back surface member 77 into a substantially semicircular shape along the outer circumferential surface of the second rod 32. The back surface member 77 is fixed to the back surface of the front surface member 73 by threading the bolts 76 to the nuts with the second rod 32 held between the rod fixing recesses 77*a* and the front surface member 73.

The lower supporting member 72 includes two support rods 78. The support rods 78 are each bent into a substantially L-shape at the central part in the axial direction. A rubber cap 79 is attached to the distal end of each support rod 78. Each support rod 78 is directly attached to the lower trunk portion 13*b* of the carrier main body 13 with the end to which the cap 79 is not attached being arranged in the space between the fixing base 55 and the second fixing member 57. The distal ends of the support rods 78 contact the second position P2 on the shell 81.

Operation of the marching carrier 70 will now be described with reference to FIGS. 7, 8A, and 8B.

As shown in FIGS. 7, 8A, and 8B, the marching carrier 70 includes the upper supporting member 71, which supports the bass drum 80 at the first position P1 on the shell 81, and the lower supporting member 72, which supports the bass drum 80 at the second position P2, which is located below the first position P1. The player P adjusts the vertical positions of the upper supporting member 71 and the lower supporting member 72 in accordance with the diameter of the bass drum 80, according to the following procedure. At this time, the player P adjusts the respective positions of the upper supporting member 71 and the lower supporting member 72 so as to reduce the load put on the player P by the marching carrier 70.

In order to adjust the upper supporting member 71, the bolts 76 are loosened to reduce the force with which the back surface member 77 and the front surface member 73 hold the second rod 32. This allows the upper supporting member 71 to slide along the second rod 32, that is, along the two front extending portions that extend from the shoulder regions toward the abdomen region. Accordingly, the vertical position of the upper supporting member 71 can be adjusted. For example, in a case of supporting a bass drum 80L having a large diameter shown in FIG. 8B, the position of the upper supporting member 71 is set to be higher than that in FIG. 8A. After the position of the upper supporting member 71 is adjusted, the bolts 76 are fastened to increase the force with which the back surface member 77 and the front surface member 73 hold the second rod 32. This fixes the upper supporting member 71 with respect to the second rod 32, so that the vertical position of the upper supporting member 71 is determined.

Also, in order to adjust the position of the lower supporting member 72, the bolts 63 are loosened to reduce the force with which the fixing base 55 and the second fixing members 57 hold the support rods 78. Accordingly, the support rods 78 are movable relative to the fixing assembly 15, so that the vertical positions of the support rods 78 are adjustable. For example, in a case of supporting a bass drum 80L having a large diameter shown in FIG. 8B, the positions of the support rods 78 are set to be lower than those in FIG. 8A.

After the positions of the support rods 78 are adjusted, the bolts 63 are fixed to increase the force with which the fixing base 55 and the second fixing members 57 hold the support rods 78. This determines the vertical positions of the support rods 78.

The second embodiment achieves the following advantages.

(1) The marching carrier 10 includes the upper supporting member 71, which supports the bass drum 80 at the first position P1 on the shell 81, and the lower supporting member 72, which supports the bass drum 80 at the second position P2, which is located below the first position P1. When the bolts 76 are loosened, the upper supporting member 71 are slidable along the two front extending portions, which extend from the shoulder regions toward abdomen region. That is, the upper supporting member 71 is slidable along the second rod 32. This configuration allows the upper supporting member 71 to slide along the second rod 32 in accordance with the diameter of the bass drum 80, which is supported by the marching carrier 70 at the front of the body of the player. That is, the vertical position of the upper supporting member 71 can be adjusted in accordance with the diameter of the bass drum 80, so that the first position on the shell 81 supported by the marching carrier 10 can be adjusted. This adjusts the distance between the first position and the second position on the shell 81, which is supported by the marching carrier 10, such that the weight of the marching carrier 10 does not concentrate on a specific section in the body. Thus, even in a case in which the player wears the marching carrier 10 and plays the bass drum 80, the load put on the player by the marching carrier 10 is reduced.

(2) The upper supporting member 71 is configured to fix the second rod 32 between the front surface member 73 and the back surface member 77. Accordingly, the force with which the back surface member 77 and the front surface member 73 hold the second rod 32 is increased or reduced, so that the upper supporting member 71 can slide along or be fixed to the second rod 32. Thus, the distance between the first position and the second position on the shell 81, which is supported by the marching carrier 10, is easily adjusted in accordance with the diameter of the bass drum 80, which is supported at the front of the body of the player. This configuration reduces the number of components as compared to a configuration in which left and right supporting members 71 are provided on opposite sides of the carrier main body 13. The weight of the marching carrier 10 is thus easily reduced.

The above-described embodiments may be modified as follows.

In each of the above-described embodiments, the carrier main body 13 is configured to adjust the position of the lower trunk portion 13*b* with respect to the upper trunk portions 13*a*. Alternatively, each upper trunk portion 13*a* may be split into two or more trunk portions, and the lower trunk portion 13*b* may be split into two or more trunk portions. In this case, the positions of the trunk portions in each upper trunk portion 13*a* may be adjustable. Also, the positions of the trunk portions in the lower trunk portion 13*b* may be adjustable.

In each of the above-described embodiments, the main-body adjusters 34 pivotally join the lower trunk portion 13*b* to the upper trunk portions 13*a*. Instead, the main-body adjusters 34 may join the lower trunk portion 13*b* to the upper trunk portions 13*a* such that the lower trunk portion 13*b* is slidable along the axis of the second rod 32. In this case, the shape of the carrier main body 13 can be changed by adjusting the position of the lower trunk portion 13*b* in the axial direction with respect to the upper trunk portions 13*a*.

In each of the above-described embodiments, the back portion 13*c* and the back-portion adjusters 35 are omitted from the carrier main body 13. That is, the carrier main body 13 may be formed by the upper trunk portions 13*a* and the lower trunk portion 13*b*.

In each of the above-described embodiments, the back-portion adjusters 35 pivotally join the upper trunk portions 13*a* to the back portion 13*c*. Instead, the back-portion adjusters 35 may join the back portion 13*c* to the upper trunk portions 13*a* such that the back portion 13*c* is slidable along the axis of the third rod 33. In this case, the shape of the carrier main body 13 can be changed by adjusting the position of the back portion 13*c* in the axial direction with respect to the upper trunk portions 13*a*.

In each of the above-described embodiments, the main-body adjusters 34 join the first rods 31 and the second rod 32 to each other while arranging the first rods 31 and the second rod 32 on the same line in plan view. Instead, the main-body adjusters 34 do not necessarily need to join the first rods 31 and the second rod 32 to each other while arranging the first rods 31 and the second rod 32 on the same line, but may join these together such that these are offset from each other in a direction intersecting with the axis of the second rod 32.

In each of the above-described embodiments, the multi-plate clutch 43 may be omitted from the main-body adjusters 34. For example, in the main-body adjusters 34, the first joint portion 41*b* and the second joint portion 42*b* may be pressed against each other, so as to fix the pivot position of the second rod 32 with respect to the first rods 31.

In each of the above-described embodiments, the framework 30, as a whole, is annular. Instead, the back portion 13*c* may be omitted from the carrier main body 13 so that the framework 30, as a whole, has the shape of a U.

In the first embodiment, the instrument supporting member 14 is fixed to the fixing assembly 15 with the support rods 50, so as to be directly attached to the lower trunk portion 13*b* of the carrier main body 13. Instead, the instrument supporting member 14 may be attached to the belly plate 12 without using the fixing assembly 15.

In each of the above-described embodiments, the insertion hole 12*a*, which is provided in the center of the belly plate 12, extends linearly from a position close to the upper end to a position close to the lower end of the belly plate 12. Instead, the insertion hole 12*a* may be replaced by a circular hole. In this case, the marching carrier 10 lacks a mechanism that adjusts the vertical position of the belly plate 12.

In the second embodiment, the upper supporting member 71 is allowed to slide along the second rod 32 by loosening the bolts 76. Instead, the second rod 32 may have fixing holes at different positions in the vertical position, such that the position of the upper supporting member 71 in the vertical position can be changed with respect to the second rod 32.

In each of the above-described embodiments, the marching carriers 10, 70 may be employed to support any instrument other than percussion instruments such as marching drums. For example, the marching carriers 10, 70 may be employed to support, for example, a xylophone, a metallophone, or a keyboard instrument. Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A marching carrier that is configured to be worn by a player and support an instrument at a front of a body of the player, the marching carrier comprising:

a belly plate that is configured to cover an abdomen region of the player and includes a belly pad in a section that contacts the abdomen region;

a carrier main body that is configured to be put on shoulders of the player and is fixed to the belly plate, the carrier main body including shoulder pads in sections that contact the shoulders; and a main-body adjuster configured to adjust a shape of the carrier main body, wherein the carrier main body includes a rod that includes two front extending portions, the front extending portions extending from the shoulders toward the abdomen region, and the carrier main body is configured to adjust a position in a front-rear direction of the belly pad, and wherein the main-body adjuster is provided in each of the front extending portions.

2. The marching carrier according to claim 1, wherein the carrier main body includes:

an upper trunk portion including the shoulder pads; and a lower trunk portion fixed to the belly plate, and the carrier main body is configured to use the main-body adjuster to adjust a position of the lower trunk portion with respect to the upper trunk portion.

3. The marching carrier according to claim 2, wherein the main-body adjuster is configured to pivotally join the lower trunk portion to the upper trunk portion, and to fix a pivot position of the lower trunk portion with respect to the upper trunk portion.

4. The marching carrier according to claim 2, wherein the carrier main body further includes:

a back portion that is configured to be put on a back region of the player and includes a back pad in a section that contacts the back region; and a back-portion adjuster configured to adjust a shape of the back portion, the back portion includes a rod that includes two rear extending portions, the rear extending portions extending from the shoulders toward the back region, and the back-portion adjuster is provided in each of the rear extending portions and is configured to adjust a position in the front-rear direction of the back pad.

5. The marching carrier according to claim 4, wherein the back-portion adjuster is configured to pivotally join the back portion to the upper trunk portion, and to fix a pivot position of the back portion with respect to the upper trunk portion.

6. The marching carrier according to claim 2, wherein the main-body adjuster pivotally joins a first rod included in the upper trunk portion and a second rod included in the lower trunk portion to each other in a state in which the first rod and the second rod are arranged on a same line.

7. The marching carrier according to claim 6, wherein the main-body adjuster includes a multi-plate clutch, the multi-plate clutch including friction plates stacked in a direction of an axis of pivoting motion of the second rod with respect to the first rod.

8. The marching carrier according to claim 1, wherein the carrier main body includes a framework, the framework including the rod and having a shape of a loop.

9. The marching carrier according to claim 1, further comprising an instrument supporting member that is configured to support an instrument at the front of the body of the player, wherein the instrument supporting member is fixed to the carrier main body.

10. The marching carrier according to claim 9, further comprising a fixing assembly configured to fix the instrument supporting member to the carrier main body, wherein the fixing assembly incudes:

a fixing base to which the instrument supporting member is fixed; and a fixing member fixed to the fixing base, and the fixing assembly is configured to fix the front extending portions between the fixing base and the fixing member.

11. The marching carrier according to claim 10, wherein the fixing assembly is configured to be fixed to the belly plate with the fixing member.

12. The marching carrier according to claim 11, wherein the belly plate includes an insertion hole into which the fixing member is inserted, and the insertion hole extends vertically.

13. A marching carrier that is configured to be worn by a player and support a drum at a front of a body of the player, wherein the drum includes:

a cylindrical shell; and a head attached to an open end of the shell, the drum is arranged such that an axis of the shell is horizontal, and is supported by the marching carrier at a first position and a second position on the shell, the second position being below the first position, the marching carrier comprises:

a belly plate that is configured to cover an abdomen region of the player and includes a belly pad in a section that contacts the abdomen region;

a carrier main body that is configured to be put on shoulders of the player and is fixed to the belly plate;

an upper supporting member that is configured to support the drum at the first position on the shell; and a lower supporting member that supports the drum at the second position on the shell, the carrier main body includes a rod that includes two front extending portions, the front extending portions extending from the shoulders toward the abdomen region, and the upper supporting member is slidably attached to the front extending portions.

14. The marching carrier according to claim 13, wherein the upper supporting member includes:

a front surface member to which the drum is joined; and a back surface member to which the front surface member is fixed, and the upper supporting member is configured to fix the front extend portions between the front surface member and the back surface member.

* * * * *